United States Patent
Phillips et al.

(10) Patent No.: US 9,563,760 B2
(45) Date of Patent: Feb. 7, 2017

(54) BIOMETRIC AUTHENTICATION FOR REGULATING ACCESS TO CONTENT SOURCES VIA A CLIENT DEVICE

(71) Applicant: Google Technology Holdings LLC, Mountain View, CA (US)

(72) Inventors: Derek Phillips, Ontario (CA); Balaji Thiagarajan, San Jose, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 203 days.

(21) Appl. No.: 14/301,806

(22) Filed: Jun. 11, 2014

(65) Prior Publication Data

US 2015/0269370 A1 Sep. 24, 2015

Related U.S. Application Data

(60) Provisional application No. 61/969,810, filed on Mar. 24, 2014.

(51) Int. Cl.
*H04L 29/00* (2006.01)
*G06F 21/32* (2013.01)
*H04L 29/06* (2006.01)

(52) U.S. Cl.
CPC .............. *G06F 21/32* (2013.01); *H04L 63/083* (2013.01); *H04L 63/0428* (2013.01); *H04L 63/0861* (2013.01)

(58) Field of Classification Search
CPC .................................. G06F 21/10; G06F 21/00
See application file for complete search history.

(56) References Cited

U.S. PATENT DOCUMENTS

| | | | |
|---|---|---|---|
| 8,539,248 B2* | 9/2013 | Hagiwara | G06F 21/32 713/185 |
| 8,572,713 B2 | 10/2013 | Buer | |
| 2001/0052077 A1* | 12/2001 | Fung | G06F 21/10 713/184 |
| 2010/0241753 A1* | 9/2010 | Garbajs | H04L 63/0428 709/227 |
| 2012/0254965 A1 | 10/2012 | Parker | |

FOREIGN PATENT DOCUMENTS

| | | | | |
|---|---|---|---|---|
| EP | 2418603 A1 | 2/2012 | | |
| IT | EP 2367354 A1 * | 9/2011 | | H04N 7/1675 |

* cited by examiner

*Primary Examiner* — Brandon Hoffman
*Assistant Examiner* — Helai Salehi
(74) *Attorney, Agent, or Firm* — Morris & Kamlay LLP

(57) ABSTRACT

A client device captures biometric data from a user and stores the biometric data to identify the user. To simplify access to content from a content source, the user identifies the content source to the client device, which identifies authentication information associated with the user by the content source. For example, the user specifies a username and password associated with the content source to the client device. The authentication information is stored in the client device using the user's biometric data. For example, the client device stores the authentication information so it is not accessible unless the client device receives the user's biometric data. When the user subsequently requests access to the content source, the user provides biometric data to the client device, which retrieves and communicates the authentication information to the content source.

21 Claims, 3 Drawing Sheets

310

//BIOMETRIC AUTHENTICATION FOR REGULATING ACCESS TO CONTENT SOURCES VIA A CLIENT DEVICE

CROSS REFERENCE TO RELATED APPLICATIONS

This application claims the benefit of U.S. Provisional Application No. 61/969,810, filed Mar. 24, 2014, which is incorporated by reference in its entirety.

BACKGROUND

This disclosure generally relates to user authentication, and more specifically to using biometric information for authenticating user access to various content sources.

Conventionally, biometric information, such as fingerprints, is used to regulate access to a local computing system or to a physical location. For example, biometric information is used to unlock a smartphone or to regulate access to a secure area of a data center. However, users increasingly access content from various content sources, such as applications or systems external to a client device associated with the user.

Typically, content sources use different authentication systems to identify users authorized to access the content sources. As an example, different content sources associate different login credentials with a user, requiring the user to separately provide different login credentials to access different content sources. While certain content sources may use single-sign on systems or central authentication services, which allow a user to access various content sources using a common login credential, many content sources do not use such authentication methods. Additionally, conventional content sources do not use biometric data to authorize a user accessing content from a device external to the content sources.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

To simplify access to content from a content source, a client device captures and stores biometric data identifying a user. For example, the client device captures one or more fingerprints associated with the user. The client device also receives an identification of the content source from the user and identifies authentication information associated with the user by the content source. For example, the user provides the client device with a username and password associated with the user by the content source. The client device stores the authentication information using the user's biometric data. For example, the client device stores the authentication information so it is not accessible unless the client device receives the user's biometric data. In some embodiments, the client device stores the authentication information in a storage device or a portion of a storage device that is not accessible unless the user's biometric data is received by the client device. Alternatively, the client device generates a key from the user's biometric data and encrypts the authentication information using the key.

Subsequently, if the user requests to access the content source via the client device, the client device captures the user's biometric data. The client device retrieves the authentication information associated with the user by the content source based on the user's biometric data. For example, the client device retrieves the authentication information from a storage device after capturing biometric data that matches the user's biometric data. The authentication information is communicated to the content source, which provides content to the client device for presentation to the user. Hence, rather than provide authentication information to a content source when content is requested, the authentication information for the content source is provided and stored on the client device using the user's biometric data, limiting access to the authentication information to the user.

System Architecture

Figure 1:
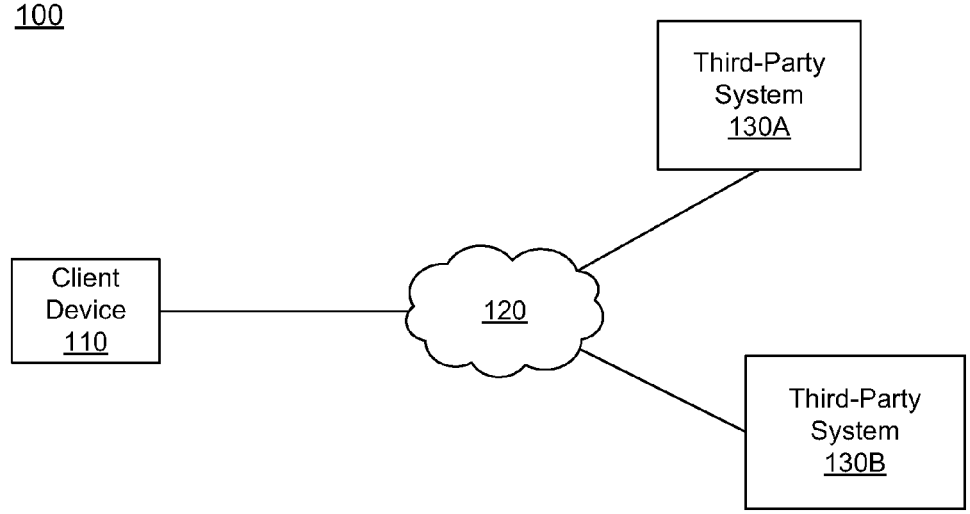
FIG. 1 is a block diagram of a system environment, in accordance with an embodiment.

FIG. 1 is a block diagram of a system environment 100 including a client device 110, a network 120, and multiple third-party systems 130A, 130B (also referred to individually and collectively using reference number 130). In various embodiments, any number of client devices 110 or third-party systems 130 are included in the system environment 100. Additionally, in alternative configurations, different and/or additional components may be included in the system environment 100.

A client device 110 is one or more computing devices capable of receiving user input as well as transmitting and/or receiving data via the network 120. In one embodiment, the client device 110 is a computer system, such as a desktop or a laptop computer. Alternatively, the client device 110 is any device with computing functionality, such as a personal digital assistant (PDA), a mobile telephone, a smartphone, a tablet computer or another suitable device. A client device 110 may include instructions for executing one or more applications that modify data or exchange data with a third-party system 130. For example, the client device 110 executes a browser that receives content from a third-party system 130 and presents the content to a user of the client device 110. In another embodiment, the client device 110 interacts with a third-party system 130 through an application programming interface (API) running on a native operating system of the client device 110, such as IOS® or ANDROID™. One embodiment of a client device 110 is further described below in conjunction with FIG. 2.

The client device 110 and the third-party systems 130A, 130B communicate with each other via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130A, 130B may be coupled to the network 120 for communicating with the client device 110. In one embodiment, a third party system 130 is an application provider communicating information describing applications for execution by the client device 110 or communicating data to the client devices 110 for use by an application executing on the client device 110. In other embodiments, a third party system 130 provides content or other information for presentation via a client device 110. Examples of content provided by a third party system 130 include text, images, video, or audio on web pages, web feeds, social networking information, messages, or other suitable data. Additional examples of content include user-generated content such as blogs, tweets, shared images, video or audio, social networking posts, and social networking status updates. Content provided by a third party system 130 may be received from a publisher and distributed by the third party system 130, or a third party system 130 may generate and distribute content itself. For convenience, content from a third party system 130, regardless of its composition, may be referred to herein as a "content item" or as "content." Content provided by a third party system 130 may include multiple types of data, such as text data, image data, video data, or audio data.

Figure 2:
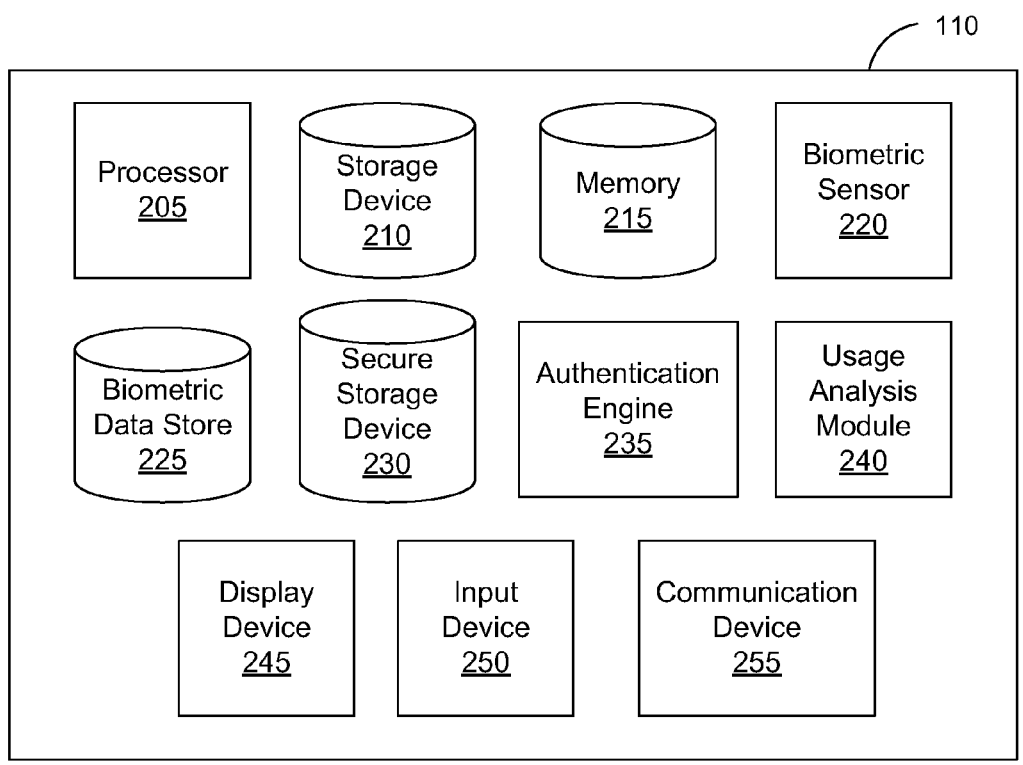
FIG. 2 is a block diagram of a client device, in accordance with an embodiment.

FIG. 2 is a block diagram of one embodiment of a client device 110. In the example shown by FIG. 2, the client device 110 includes a processor 205, a storage device 210, a memory 215, one or more biometric sensors 220, a biometric data store 225, a secure storage device 230, an authentication engine 235, a usage analysis engine 240, a display device 245, an input device 250, and a communication module 255. However, in other embodiments, the client device 110 may include different and/or additional components than those described in conjunction with FIG. 2.

The client device 110 includes one or more processors 205, which retrieve and execute instructions from the storage device 210 or the memory 215. Additionally, a processor 205 receives information from the input device 250 and executes one or more instructions included in the received information. The storage device 210 is a persistent storage device including data and/or instructions for execution by the processor 205 or for presentation to a user of the client device. Examples of a storage device 210 include a solid-state drive, a flash memory drive, a hard drive, or other suitable persistent storage device.

The memory 215 stores instructions for execution by the one or more processors 205. In various embodiments, the memory 215 is a volatile storage medium, while the storage device 210 is a non-volatile storage medium. Examples of a volatile storage medium include random access memory (RAM), static random access memory (SRAM), and dynamic random access memory (DRAM). Storing data or instructions in the memory 215 allows a processor 205 to retrieve the data or instructions more rapidly than data or instructions stored in the storage device 210. Data or instructions included in the memory 215 may be modified at various time intervals or in response to data received from a processor 205.

In one embodiment, the memory 215 is partitioned into a plurality of regions that are each associated with an identifier. For example, the memory 215 includes multiple slots that each represent a specified amount of the memory 215 and are each associated with an address, allowing data stored in a slot to be retrieved using an address associated with a slot. Hence, different data may be stored in different slots and subsequently retrieved based on the identifiers associated with the slots.

A biometric sensor 220 is a device configured to capture biometric data associated with a user, which is stored in the biometric data store 225. Biometric data describes one or more physical traits of a user of the client device 110 capable of uniquely identifying the user.

The secure storage device 230 is a persistent storage device that includes data to which access is limited to an authorized user of the client device. For example, the secure storage device 230 includes authentication information associated with a user by different content sources. Examples of content sources include a third party system 130 or an application included in the storage device 210 and executed by the processor 205. The authentication information may include a combination of a username and a password, a combination of an account number and a password, an account number, a personal identification number, an access code, or any other information for verifying a user's identity to a content source. While FIG. 2 shows the secure storage device 230 as a separate component from the storage device 210, in some embodiments, the secure storage device 230 is a portion of the storage device 210.

In some embodiments, data stored in the secure storage device 230 is encrypted using one or more suitable encryption methods. Further, data associated with different content sources may be encrypted when stored in the secure storage device 230. For example, different content sources specify different encryption methods or different encryption keys for encrypting authentication information associated with different authentication information. Alternatively, data stored in the secure storage device 230 is encrypted using an encryption method applied to different data.

While FIG. 2 shows the secure storage device 230 included in the client device 110, in some embodiments the secure storage device 230 may be external to the client device 110. For example, the secure storage device 110 is included in a computing system, such as a server, separate from the client device 110, but coupled to the client device 110 via the network 120. After determining that a user is authorized to access the secure storage device 230, as further described below, the client device 110 communicates with the computing system including the secure storage device 230 to retrieve stored information associated with the user.

To limit access to the secure storage device 230, the authentication engine 235 communicates with the biometric sensor 220 and the biometric data store 225 when a request to access the secure storage device 230 is received to verify that a user of the client device 110 requesting access is the user authorized to access the secure storage device 230 (i.e., the authorized user). In one embodiment, when a request to access the secure storage device 230 is received, the authentication engine 235 prompts a user of the client device 110 to provide biometric data via a biometric sensor 220. Biometric data captured by the biometric sensor 220 is communicated to the authentication engine 235, which compares the captured data to biometric data stored in the biometric data store 225. If the captured biometric data matches the biometric data stored in the biometric data store 225, the authorization engine 235 determines that the user of the client device 110 is the authorized user and retrieves information from the secure storage device 230. In some embodiments, the authorization engine 235 may compare captured biometric data to biometric data stored in an additional client device 110 or in a server coupled to the client device 110 via the network 120 to determine if a user is the authorized user. For example, after capturing biometric data, the authorization engine 235 communicates the captured biometric data to an additional client device 110, such as an additional client device 110 within a threshold distance of the client device 110, to determine whether the captured biometric data matches biometric data stored by the additional client device 110.

For example, if a user of the client device 110 requests content from a content source, the content source requests authentication information previously associated with the user by the content source from the secure storage device 230. In response to the request for authentication information from the secure storage device 230, the authentication engine 235 prompts a user of the client device 110 to provide biometric data via a biometric sensor 220. Biometric data captured by the biometric sensor 220 is communicated to the authentication engine 235, which compares the captured biometric data to biometric data stored in the biometric data store 225. If the captured biometric data matches the biometric data in the biometric data store 225, the authentication engine 235 determines that the user is authorized to access the secure storage device 230 and communicates authentication information associated with the content source to the content source for verifying that the user is authorized to access content from the content source. Retrieval of authentication information form a content source from the secure data storage device 230 based on biometric data is further described below in conjunction with FIG. 3.

The usage analysis module 240 identifies user interactions with various content sources (e.g., a third party system 130, an application executing on the client device 110) and identifies one or more content sources based on historical user interactions with content sources. For example, the usage analysis module 240 stores a timestamp along with a content source identifier to identify dates and times when a user accessed a content source associated with the content source identifier via the client device 110. In some embodiments, the usage analysis module 240 also maintains data describing a type of interaction between a user and a content source. Over a time interval, the usage analysis module 240 analyzes user interactions with various content sources to identify content sources with which the user had a threshold amount of interaction or with which the user had a threshold frequency of interaction. For example, the usage analysis module 240 identifies content sources that a user accessed at least a threshold number of times within a month. In some embodiments, the usage analysis module 240 retrieves information describing user interaction with a content source from the content source. Additionally, information describing user interaction with content sources may be subject to one or more privacy settings specified by the user. Privacy settings limit the information describing user interaction with a content source maintained by the usage analysis module 240 or limit access of the usage analysis module 240 to data maintained by a content source describing user interaction with the content source. Identification of content sources based on user interaction with content sources is further described below in conjunction with FIG. 4.

A display device 245 presents content and other information to a user of the client device 110. Examples of the display device 245 include a liquid crystal display (LCD), an organic light emitting diode (OLED) display, an active matrix liquid crystal display (AMLCD), or any other suitable device. Different client devices 110 may have display devices 245 with different sizes, different resolutions, or other different characteristics.

For purposes of illustration, FIG. 2 shows a single input device 250; however, the client device 110 may include multiple input devices 250 in various embodiments. The input device 250 receives input from a user of the client device 110. Examples of the input device 250 include a touch-sensitive display, a keyboard, a dial pad, a mouse, and a trackpad. Using a touch-sensitive display allows the client device 110 to combine the display device 245 and the input device 250, simplifying user interaction with presented content. Inputs received via the input device 250 are be processed by the processor 205 and may be communicated to a third party system 130 or to another client device 110 via the communication module 255.

The communication module 255 transmits data from the client device 110 to another client device 110 or to a third party system 130 via the network 120. Additionally, the communication module 255 receives data via the network 120 (e.g., data from another client device 110 or from a third party system 130) and communicates the received data to one or more components of the client device 110. For example, the communication module 255 is a wireless transceiver configured to transmit data using one or more wireless communication protocols. Example wireless communication protocols include: Global System of Mobile (GSM), Code Division, Multiple Access (CDMA), General Packet Radio Service (GPRS), third-generation (3G) mobile, fourth-generation mobile (4G), High Speed Download Packet Access (HSDPA), High Speed Uplink Packet Access (HSUPA), Long-Term Evolution (LTE) and Worldwide Interoperability for Microwave Access (WiMAX). In some embodiments, the communication module 255 enables connection to the network 120 through a wired communication protocol such as Ethernet. Additionally, the communication module 255 may transmit data using near field communication (NFC), BLUETOOTH®, or other suitable communication methods for communicating data to client devices 110 or other devices. While FIG. 2 shows a single communication module 255, multiple communication modules 255 may be included in the client device 110 in some embodiments.

Verifying User Access to Content Sources Via Biometric Data

Figure 3:
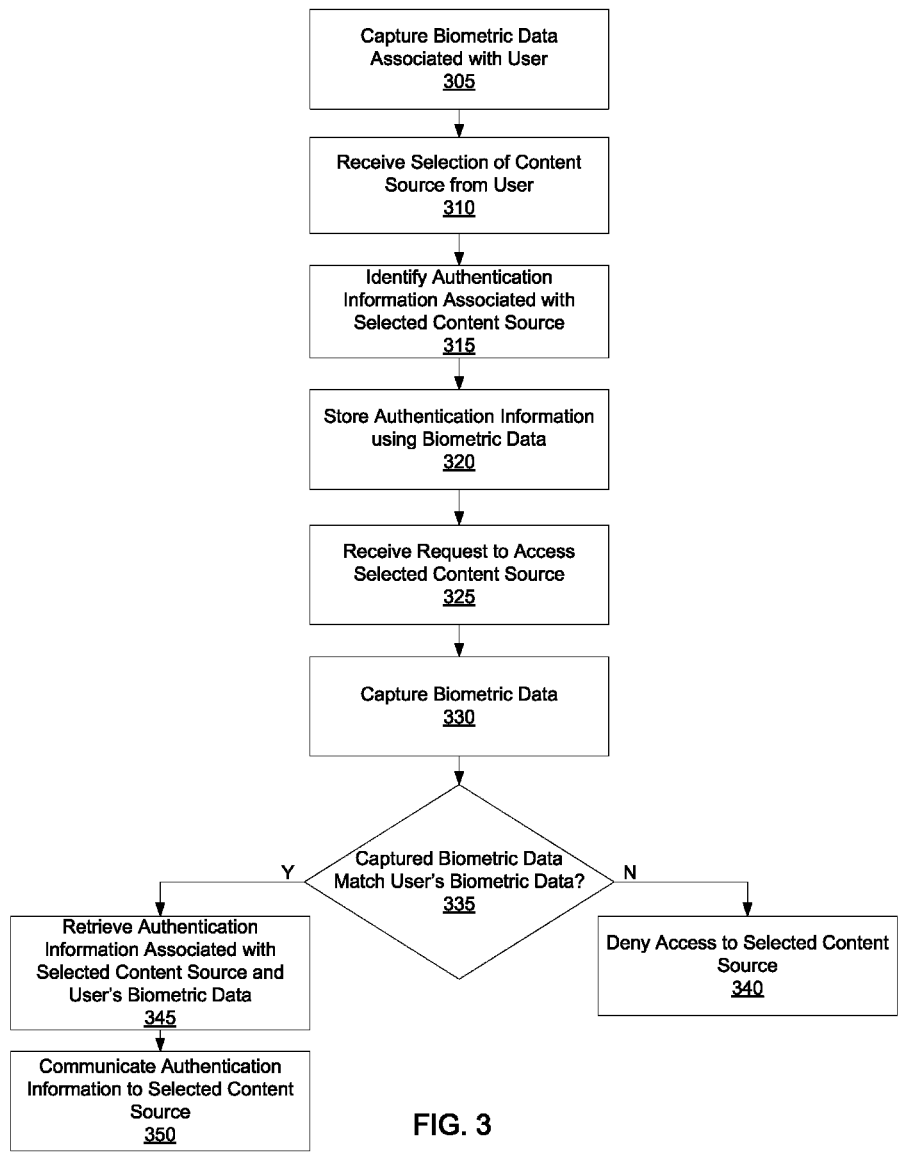
FIG. 3 is a flow chart of a method for determining user access to a content source using by associating the user's biometric information with authentication information for the content source, in accordance with an embodiment.

FIG. 3 is a flow chart of one embodiment for determining user access to a content source using by associating a user's biometric information with authentication information for the content source. In other embodiments, the method includes different or additional steps than those shown in the example described in conjunction with FIG. 3. Additionally, some embodiments may perform steps described in conjunction with FIG. 3 in different orders.

A client device 110 captures 305 biometric data associated with a user and capable of identifying a user. The captured biometric data is stored by the client device 110 along with information identifying the user, such as a user profile identifier. For example, the client device 110 captures 305 biometric data associated with the user via one or more biometric sensors 225 included in the client device 110. As another example, the client device 110 receives biometric data and a user identifier from a device external to the client device 110 and stores the received information. Any biometric data or combination of biometric data suitable for identifying the user may be captured 305. Examples of biometric data include one or more fingerprints of the user, an image or other data describing facial features of the user, a palmprint of the user, information describing a pattern of an iris of the user, a sample of a voice of the user, and information describing a vascular pattern of one or more fingers of the user; however, any other suitable biometric information may be captured 305 and stored by the client device 110.

After capturing 305 and storing the biometric data associated with the user, the client device 110 receives 310 a selection of a content source from the user. Examples of a content source include a third party system 130 external to the client device 110, an application executing on the client device 110, or any other entity providing content for presentation to the user via the client device 110. Different content sources may associate different authentication information with the user, so the user provides authentication information associated with the user by a content source to the content source to access content from the content source. In one embodiment, the client device 110 identifies one or more content sources to the user via the display device 245 and receives 310 a selection of a content source from an input device 250. For example, the client device 110 identifies candidate content sources that the user accesses with a threshold frequency or accesses a threshold number of times and presents information identifying the candidate content sources to the user. This allows the user to select from content sources with which the user commonly or frequently interacts via the client device 110. Identification of candidate content sources is further described below in conjunction with FIG. 4. Alternatively, a selection of a content source is received 310 when the user requests to access content from the content source.

Authentication information associated with the user by the selected content source is identified 315 by the client device 110. Different types of authentication information may be associated with a user by a content source. Examples of authentication information associated with a user include a combination of a username and a password, a personal identification code, a username, a password, a security question and associated answer, and a device identifier. In one embodiment, the client device 110 prompts the user to provide the authentication information associated with the user by the selected content source. Alternatively, the client device 110 requests the authentication information from the selected content source. In other embodiments, the user specifies a portion of the authentication information that is communicated to the content source, which provides an additional portion of the authentication information to the client device 110.

The client device 110 stores 320 the authentication information associated with the user by the content source using the captured biometric data associated with the user. In one embodiment, the client device 110 stores 320 the authentication information and a content source identifier of the selected content source in a secure storage device 230, which limits access to stored data to the user associated with the captured biometric data. The client device 110 may encrypt the authentication information associated with the content source identifier using biometric data associated with the user and store the encrypted data in the secure storage device 230 or another storage device 210. In some embodiments, the client device 110 uses a portion of the captured biometric data to limit access to the secure storage device 230 while encrypting the authentication information using another portion of the captured biometric data and storing the encrypted authentication information in the secure storage device 230. Alternatively, the client device 110 may encrypt the authentication information using an encryption method specified by the selected content source or by any other suitable encryption method and store the encrypted authentication information in the secure storage device 230. By storing 320 the authentication information in a secure storage device 230 that limits access to stored information to a user associated with the captured biometric data, the client device 110 securely maintains the authentication information.

While FIG. 3 describes storing 320 authentication information from a selected content source, in various embodiments, any data from the selected content source may be stored using the captured biometric data. For example, a content source maintains a contact list associated with a user and indicates that the content list is stored with increased security. The content source communicates the contact list to the client device 110 along with a user identifier and an indication to apply increased security when storing the content list, so the client device 110 stores the contact list in the secure storage device 230 or in another location where access to data is limited to a user with biometric data matching biometric data stored by the client device 110. This allows content providers to securely store different types of data in the client device 110 or to modify types of data securely stored in the client device 110. By limiting access to certain stored data to a user having biometric data matching stored biometric data, the client device 110 provides content providers with the ability to securely store data associated with a user on the client device 110.

After storing 320 the authentication data associated with the user by the selected content source using the biometric data captured 305 from the user, the client device 110 receives 325 a request to access the selected content source. For example, the client device 110 receives 325 a request to access an application or receives 325 a request to access a network address associated with a third party system 130. In response to receiving 325 the request to access the selected content source, the client device 110 captures biometric data 330 of a user associated with the client device 110 when the request was received 325 via one or more biometric sensors 220. For example, the client device 110 captures one or more fingerprints of the user associated with the client device 110 when the request was received 325; however, any suitable biometric data may be captured 330 from the user associated with the client device 110 when the request was received 325.

The client device 110 determines 335 whether the stored biometric data associated with the user matches the biometric data captured 330 from the user associated with the client device 110 when the request to access the selected content source was received 325. For example, the client device 110 calculates a measure of similarity between the stored biometric data and the biometric data captured 330 from the user associated with the client device 110 when the request to access the selected content source was received 325. If the measure of similarity has less than a threshold value, the client device 110 determines 335 the stored biometric data associated with the user does not match the biometric data captured 330 from the user associated with the client device 110 when the request to access the selected content source was received 325 and denies 340 the user associated with the client device 110 when the request was received 325 access to the authentication information associated with the selected content source and stored 320 by the client device 110.

However, if the client device 110 determines 335 the stored biometric data associated with the user matches the biometric data captured 330 from the user associated with the client device 110 when the request to access the selected content source was received 325, the client device 110 retrieves 345 the authentication information associated with the selected content source stored 320 in the client device 110. For example, if a measure of similarity between the stored biometric data associated with the user and the biometric data captured 330 from the user associated with the client device 110 when the request to access the selected content source was received 325 has at least a threshold value, the authentication information stored 320 by the client device 110 is retrieved 345. In some embodiments, additional information may be requested from the user after determining 335 that the stored biometric data associated with the user matches the biometric data captured 330 from the user associated with the client device 110 when the request to access the selected content source was received 325. For example, if the stored authentication information is encrypted, the user associated with the client device 110 having biometric data matching the stored biometric data is prompted for a key to decrypt the stored authentication information. In some embodiments, additional biometric data may be captured by the client device 110 to decrypt the stored authentication information after determining that the stored biometric data associated with the user matches the biometric data captured 330 from the user associated with the client device 110 when the request to access the selected content source was received 325.

The client device 110 communicates 350 the retrieved authentication information to the selected content source, which provides content to the client device 110 for presentation. For example, the client device 110 communicates 350 the retrieved authentication information to a third party system 130, which subsequently provides content to the client device 110. As another example, the client device 110 communicates 350 the authentication information to an application executing by the client device 110, which subsequently presents content to the user via the client device 110.

In other embodiments, the client device 110 may present information received from the selected content source and stored in the client device 110 using biometric data stored by the client device 110 if stored biometric data associated with the user matches biometric data captured 330 from the user associated with the client device 110 when the request to access the selected content source was received 325. For example, the client device 110 stores account information received from the selected content source using stored biometric data and presents the account information to a user requesting the account information that has biometric data matching biometric data stored by the client device 110. Additionally, the selected content source may provide information to the client device 110 to be stored using the stored biometric data at various time intervals. For example, the selected content source may communicate updated account information to the client device at a periodic interval and indicate that the updated account information is to be stored with increased security, so the client device 110 stores the updated account information in the secure storage device 230, limiting access to the updated account information to a user with biometric data matching the stored biometric data.

Figure 4:
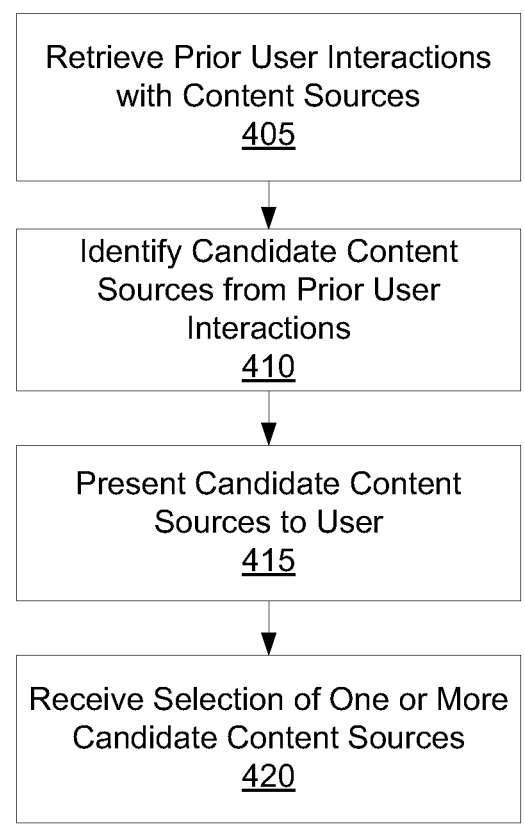
FIG. 4 is a flow chart of a method for identifying content sources to a user for configuring biometric access to the content sources, in accordance with an embodiment.

Identifying Content Sources to Use Biometric Data for Retrieving Authentication Information FIG. 4 is a flow chart of a method for identifying candidate content sources to a user to use biometric data for accessing content source authentication information. In other embodiments, the method includes different or additional steps than those shown in the example described in conjunction with FIG. 4. Additionally, some embodiments may perform steps described in conjunction with FIG. 4 in different orders.

The client device 110 retrieves 405 data describing prior user interactions with various content sources. In some embodiments, the client device 110 stores data describing interactions between a user and different content sources subject to user privacy settings. For example, one or more timestamps indicating dates and times when the user accessed a content source via the client device 110 are maintained in the storage device 210 or a usage analysis module 240 of the client device 110. Alternatively, a content source maintains information describing user interactions with the content source, and the client device 110 communicates user identifying information to the content source, which retrieves and communicates information describing the user's interaction with the content source to the client device 110. The user may specific one or more privacy settings associated with a content source to limit the information describing user interaction maintained by the content source. For example, privacy settings limit the information stored by a content source describing user interaction or limit the accessibility of entities other than the content source to information describing user interaction maintained by the content source.

Based on prior user interactions with content sources from the retrieved data, the client device 110 identifies 410 one or more candidate content sources. In one embodiment, content sources with which the user interacts at least a threshold number of times during a time interval are identified 410 as candidate content sources. Alternatively, candidate content sources are identified 410 as content sources with which the user has a threshold frequency of interaction over a time interval. In some embodiments, the client device 110 may identify types of interactions between the user and a content source during a time interval and identify 410 candidate content sources based at least in part on the types of interactions between the user and a content source. For example, content sources with which the user performed at least a threshold number of certain types of interactions within a time interval or performed one or more types of interactions with at least a threshold frequency are identified 410 as candidate content sources. In some embodiments, content sources are ranked based on the amount or frequency of user interaction with each content source, and content sources having at least a threshold position in the ranking are identified 410 as candidate content sources. As another example, a score is determined for various content sources based on an amount of user interaction with each content source, a frequency of user interaction with each content source, or types of user interaction with each content source, and content sources associated with at least a threshold score are identified 410 as candidate content sources.

The client device 110 presents 415 one or more of the candidate content sources to the user. For example, a set of the candidate content sources are presented 415 to the user, and a selection of one or more of the presented candidate content sources is received 420 from the user. In one embodiment, the client device 110 presents 415 a listing of candidate content sources to the user, and receives 420 a selection of one or more of the candidate content sources from the user. Identifying candidate content sources based in part on prior interactions between the user and content sources allows the client device 110 to simplify user interaction with content via the client device 110 by recommending content sources for the user to use biometric data to retrieve authentication information for accessing the content sources. Allowing a user to retrieve authentication information for a content source using biometric data associated with the user simplifies retrieval of content from the content source by allowing the user to provide biometric data to the client device 110, which retrieves stored authentication information associated with the user for communication to the content source based on the biometric data.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of using biometric authentication to regulate access to content sources via a client device comprising:
   capturing, in the client device, biometric data associated with a user of the client device, the biometric data identifying the user;
   storing the biometric data associated with the user in the client device;
   identifying respective authentication information associated with the user by two or more content sources, the authentication information used by the two or more content sources to identify the user;
   storing the authentication information and an association between the authentication information and each content source in the client device based at least in part on the biometric data associated with the user;
   receiving a selection of a content source from among the two or more content sources;
   receiving a request to access content from the content source;
   responsive to the request, capturing biometric data associated with a user of the client device at a time when the request was received;
   determining whether the captured biometric data matches the biometric data associated with the user;
   responsive to determining the captured biometric data matches the biometric data associated with the user, retrieving the authentication information associated with the user by the content source from the client device;
   communicating the authentication information associated with the user by the content source to the content source; and
   presenting content received from the content source to the user via the client device.

2. The method of claim 1 wherein the biometric data identifying the user comprises one or more fingerprints associated with the user.

3. The method of claim 1, wherein the biometric data identifying the user is selected from a group consisting of: describing facial features of the user, a palmprint of the user, information describing a pattern of an iris of the user, a sample of a voice of the user, information describing a vascular pattern in one or more fingers of the user, and any combination thereof.

4. The method of claim 1, wherein receiving the selection of the content source comprises:
   identifying one or more candidate content sources based on prior user interaction with content sources;
   presenting the one or more candidate content sources to the user via the client device; and
   receiving a selection of a candidate content source.

5. The method of claim 1, wherein the content source is selected from a group consisting of: a third party system, an application executing on the client device, and any combination thereof.

6. The method of claim 1, wherein storing the authentication information and the association between the authentication information and the biometric data in the client device comprises:
storing the authentication information in a storage device of the client device having access to the storage device limited by the biometric data associated with the user.

7. The method of claim 1, wherein storing the authentication information and the association between the authentication information and the content source in the client device based at least in part on the biometric data associated with the user comprises:
storing the authentication information in a storage device of the client device having access to the storage device limited by the biometric data associated with the user.

8. The method of claim 1, wherein storing the authentication information and the association between the authentication information and the content source in the client device based at least in part on the biometric data associated with the user comprises:
encrypting the authentication information; and
storing the encrypted authentication information in association with information identifying the content source in the client device based at least in part on the biometric data associated with the user.

9. The method of claim 4, wherein identifying one or more candidate content sources based on prior user interaction with content sources comprises:
retrieving information describing prior interaction between the user and various content sources; and
identifying content sources with which the user interacted at least a threshold number of times within a time interval as candidate content sources.

10. The method of claim 4, wherein identifying one or more candidate content sources based on prior user interaction with content sources comprises:
retrieving information describing prior interaction between the user and various content sources; and
identifying content sources with which the user had at least a threshold frequency of interaction within a time interval as candidate content sources.

11. The method of claim 8, wherein encrypting the authentication information is based at least in part on the biometric data associated with the user.

12. The method of claim 8, wherein encrypting the authentication information is based at least in part on additional biometric data associated with the user.

13. A method of using biometric authentication to regulate access to content sources via a client device comprising:
capturing, in the client device, biometric data associated with a user of the client device, the biometric data identifying the user;
storing the biometric data associated with the user in the client device;
receiving data from two or more content sources;
storing the data and an association between the data and the content sources in the client device based at least in part on the biometric data associated with the user;
receiving a selection of a content source from among the two or more content sources;
receiving a request to access content from the content source;
responsive to the request, capturing biometric data associated with a user of the client device at a time when the request was received;
determining whether the captured biometric data matches the biometric data associated with the user; and
responsive to determining the captured biometric data matches the biometric data associated with the user, retrieving the data stored in the client device.

14. The method of claim 13 wherein the biometric data identifying the user comprises one or more fingerprints associated with the user.

15. The method of claim 13, wherein the biometric data identifying the user is selected from a group consisting of: describing facial features of the user, a palmprint of the user, information describing a pattern of an iris of the user, a sample of a voice of the user, information describing a vascular pattern in one or more fingers of the user, and any combination thereof.

16. The method of claim 13, wherein the data from the content source comprises authentication information associated with the user by the content source.

17. The method of claim 13, wherein receiving the selection of the content source comprises:
identifying one or more candidate content sources based on prior user interaction with content sources;
presenting the one or more candidate content sources to the user via the client device; and
receiving a selection of a candidate content source.

18. A computer program product comprising a non-transitory computer-readable storage medium having instructions encoded thereon that, when executed by a processor, cause the processor to:
capture, in a client device, biometric data associated with a user of the client device, the biometric data identifying the user;
store the biometric data associated with the user in the client device;
identify respective authentication information associated with the user by two or more content sources, the authentication information used by the two or more content sources to identify the user;
store the authentication information and an association between the authentication information and each content source in the client device based at least in part on the biometric data associated with the user;
receive a selection of a content source from among the two or more content sources;
receive a request to access content from the content source;
responsive to the request, capture biometric data associated with a user of the client device at a time when the request was received;
determine whether the captured biometric data matches the biometric data associated with the user;
responsive to determining the captured biometric data matches the biometric data associated with the user, retrieve the authentication information associated with the user by the content source from the client device; and
communicate the authentication information associated with the user by the content source to the content source.

19. The computer program product of claim 18 wherein the biometric data identifying the user comprises one or more fingerprints associated with the user.

20. The computer program product of claim 18, wherein the biometric data identifying the user is selected from a group consisting of: describing facial features of the user, a palmprint of the user, information describing a pattern of an iris of the user, a sample of a voice of the user, information describing a vascular pattern in one or more fingers of the user, and any combination thereof.

21. The computer program product of claim 18, wherein receive the selection of the content source comprises:
   identify one or more candidate content sources based on prior user interaction with content sources;
   present the one or more candidate content sources to the user via the client device; and
   receive a selection of a candidate content source.

\* \* \* \* \*